US008810149B2

(12) United States Patent  
Terazawa

(10) Patent No.: US 8,810,149 B2  
(45) Date of Patent: Aug. 19, 2014

(54) LIGHTING APPARATUS

(75) Inventor: Noriaki Terazawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 160 days.

(21) Appl. No.: 13/386,299

(22) PCT Filed: Jul. 15, 2010

(86) PCT No.: PCT/JP2010/061952  
§ 371 (c)(1),  
(2), (4) Date: Jan. 20, 2012

(87) PCT Pub. No.: WO2011/010591  
PCT Pub. Date: Jan. 27, 2011

(65) Prior Publication Data  
US 2012/0126717 A1    May 24, 2012

(30) Foreign Application Priority Data

Jul. 21, 2009   (JP) ................................. 2009-170451

(51) Int. Cl.  
*H05B 37/02*    (2006.01)  
*H05B 41/392*    (2006.01)  
*H05B 41/282*    (2006.01)

(52) U.S. Cl.  
CPC ........ *H05B 41/3927* (2013.01); *H05B 41/2828* (2013.01)  
USPC ............................. 315/291; 315/297; 315/307

(58) Field of Classification Search  
CPC ........... H05B 41/3927; H05B 41/2828; H05B 33/0815  
USPC .................. 315/291, 294, 297, 307  
See application file for complete search history.

(56) References Cited

U.S. PATENT DOCUMENTS

| 2004/0251854 | A1 | 12/2004 | Matsuda et al. | |
| 2006/0001381 | A1 | 1/2006 | Robinson et al. | |
| 2008/0284346 | A1 | 11/2008 | Lee | |
| 2009/0261748 | A1* | 10/2009 | Mckinney et al. | 315/254 |
| 2010/0219764 | A1 | 9/2010 | Yamasaki et al. | |
| 2011/0012530 | A1* | 1/2011 | Zheng et al. | 315/294 |
| 2011/0057576 | A1 | 3/2011 | Otake et al. | |

FOREIGN PATENT DOCUMENTS

| JP | 2003-157986 A | 5/2003 |
| JP | 2005-347645 A | 12/2005 |
| JP | 2006-206001 A | 8/2006 |
| JP | 2006-210848 A | 8/2006 |

(Continued)

OTHER PUBLICATIONS

International Search Report, PCT/JP2010/061952, Oct. 19, 2010.

*Primary Examiner* — Jason M Crawford  
(74) *Attorney, Agent, or Firm* — Birch, Stewart, Kolasch & Birch, LLP

(57) ABSTRACT

In a lighting apparatus including an emission unit and a constant current control part and/or a constant voltage control part for controlling a light quantity of the emission unit on the basis of a control signal, the constant current control part and/or the constant voltage control part includes light quantity control means for controlling the light quantity by changing the magnitude of a current and/or a voltage to be supplied to the emission unit in accordance with the control signal. Since no switching element is used in dimming level control of the emission unit, noise derived from an on/off operation of a switching element is not caused, and hence, noise may be reduced.

9 Claims, 12 Drawing Sheets

(56) References Cited

FOREIGN PATENT DOCUMENTS

| | | |
|---|---|---|
| JP | 2006-244878 A | 9/2006 |
| JP | 2008-210537 A | 9/2008 |
| JP | 2009-054433 A | 3/2009 |
| JP | 2009-123681 A | 6/2009 |
| JP | 2009-152213 A | 7/2009 |
| JP | 2009-232623 A | 10/2009 |
| WO | WO 03/055273 A2 | 7/2003 |

* cited by examiner

F I G. 6
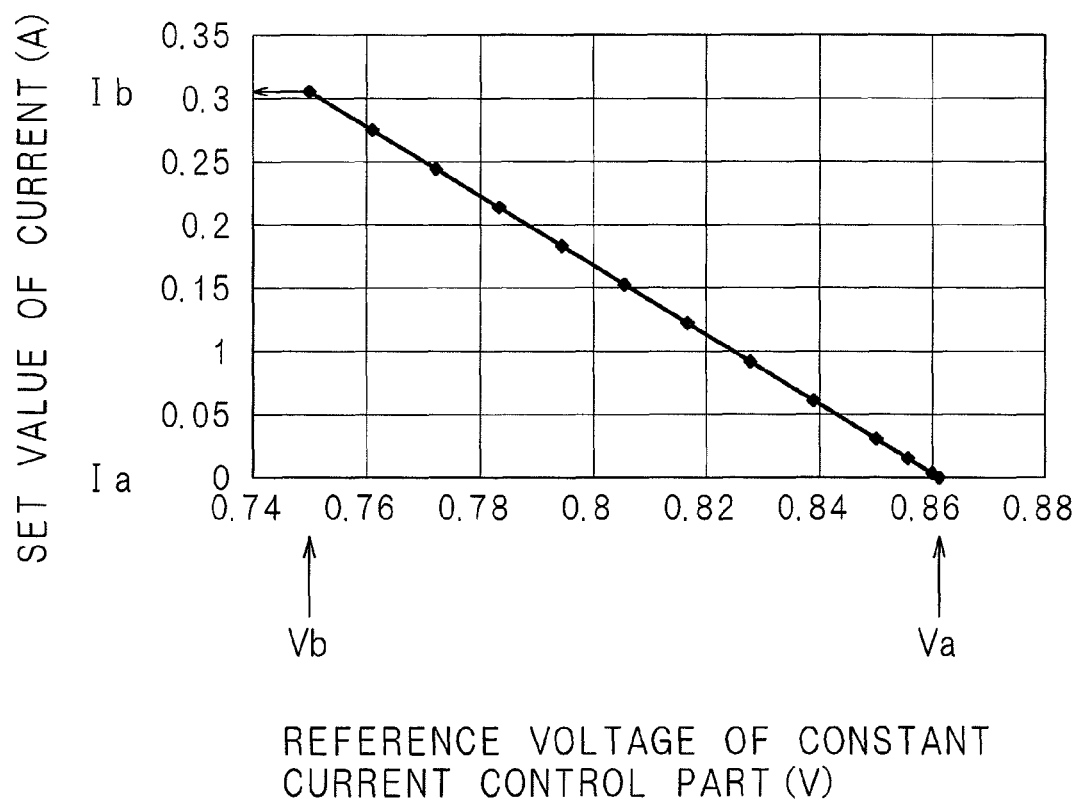

LIGHTING APPARATUS

This application is the national phase under 35 U.S.C. §371 of PCT International Application No. PCT/JP2010/061952 which has an International filing date of Jul. 15, 2010 and designated the United States of America.

BACKGROUND

1. Technical Field

The present invention relates to a lighting apparatus constructed to change the light quantity of a light source on the basis of an externally supplied control signal.

2. Description of Related Art

In lighting apparatuses used for indoor/outdoor lighting, an incandescent lamp, a fluorescent lamp or the like is conventionally used as a light source. Since the brightness of a light emitting diode (hereinafter referred to as an LED) has been improved and a blue LED has been developed recently, a white LED obtained by combining a blue LED and a phosphor has been put to practical use, and accordingly, an LED having characteristics of compactness, small power consumption, a long life and the like is used as a light source for the lighting.

With respect to lighting apparatuses using conventional light sources, a lighting apparatus having a structure in which the light source may be dimmed in accordance with a control signal such as a dimming control signal supplied from external equipment such as a dimming level controller is widely used. As this control signal, a PWM (pulse width modulation) signal having a duty ratio varied in accordance with a dimming level (i.e., a level of brightness) is generally used. Also with respect to lighting apparatuses using LEDs as light sources, various lighting apparatuses having a structure in which the light source may be similarly dimmed in accordance with such a control signal have been proposed (see, for example, Japanese Patent Application Laid-Open No. 2003-157986).

A lighting apparatus disclosed in Japanese Patent Application Laid-Open No. 2003-157986 is constructed to perform dimming level control, on the basis of a pulse signal externally inputted as a control signal, by combining control of a voltage to be applied to an LED and switch dimming with a switching element for connecting/disconnecting an LED current.

In this lighting apparatus, the voltage to be applied is controlled on the basis of the control signal by varying the on time of the on/off operation of the switching element with the voltage to be applied to the LED kept constant when the extent of dimming is small (i.e., when it is bright), and by varying the voltage to be applied to the LED with the on time of the on/off operation of the switching element kept constant when the extent of dimming is large (i.e., when it is dark). In this manner, the dimming level control may be performed in proportion to the control signal even when the extent of dimming is large (i.e., when it is dark).

SUMMARY

The lighting apparatus of Patent Document 1 Japanese Patent Application Laid-Open No. 2003-157986 is, however, constructed to change, for the dimming level control, an average value of a current to be supplied to an LED through the on/off operation of the switching element, and hence, there arises a problem that noise is caused due to the on/off operation of the switching element. Furthermore, it has a problem of poor luminous efficiency (=light quantity/input power).

The present invention has been devised in consideration of these circumstances, and an object of the invention is providing a lighting apparatus capable of improving luminous efficiency and reducing occurrence of noise.

The lighting apparatus of this invention includes a light source; and a control part controlling a light quantity of the light source on the basis of a control signal, the control part including light quantity control means for controlling the light quantity by changing magnitude of a current and/or a voltage to be supplied to the light source in accordance with the control signal.

According to this invention, the light quantity control means for controlling the light quantity of the light source by changing the magnitude of the current and/or the voltage to be supplied to the light source in accordance with the control signal is included. Since no switching element is used in dimming level control of the light source, noise derived from the on/off operation of a switching element is not caused, and hence, noise may be reduced. Furthermore, as compared with a PWM method in which the dimming level control is conducted by changing an average value of a current to be supplied to a light source by changing an on time of the on/off operation of a switching element, a predetermined light quantity may be obtained with small input power, and hence, luminous efficiency may be improved.

The lighting apparatus of this invention includes a light source of which a light quantity is controlled on the basis of a control signal; and light quantity control means for controlling the light quantity by changing magnitude of a current and/or a voltage to be supplied to the light source.

According to this invention, the light quantity control means for controlling the light quantity of the light source by changing the magnitude of the current and/or the voltage to be supplied to the light source is included. Since no switching element is used in the dimming level control of the light source, noise derived from the on/off operation of a switching element is not caused, and hence, noise may be reduced. Furthermore, as compared with the PWM method in which the dimming level control is conducted by changing an average value of a current to be supplied to a light source by changing an on time of the on/off operation of a switching element, a predetermined light quantity may be obtained with small input power, and hence, luminous efficiency may be improved.

The lighting apparatus of this invention includes a light source; and a control part controlling a light quantity of the light source on the basis of an externally supplied control signal, the control part controlling the light quantity by changing magnitude of a current and/or a voltage to be supplied to the light source in accordance with the control signal.

In the structure according to this invention, the light quantity of the light source is controlled by changing the magnitude of the current and/or the voltage to be supplied to the light source on the basis of the externally supplied control signal. Since the dimming level control is conducted by changing the magnitude of the current and/or the voltage to be supplied to the light source and no switching element is used for the dimming level control of the light source, noise derived from the on/off operation of a switching element is not caused, and hence, noise may be reduced. Furthermore, in the case where the dimming level control is conducted by changing the magnitude of the current, as compared with the PWM method in which the dimming level control is conducted by changing an average value of a current to be supplied to a light source by changing an on time of the on/off operation of a switching element, a predetermined light quantity may be obtained with small input power, and hence, the luminous efficiency may be improved.

In the lighting apparatus of this invention, the control signal is a digital signal, and the lighting apparatus further includes a conversion part converting the control signal into an analog voltage; and an output part outputting, to the control part, a set value of the current and/or the voltage to be supplied to the light source in accordance with the converted analog voltage.

According to this invention, the control signal of a digital signal is converted into the analog voltage by the conversion part, in accordance with the thus converted analog voltage, the set value of the current and/or the voltage is outputted to the control part by the output part, and the current and/or the voltage with the thus outputted set value is supplied to the light source. Since the dimming level control is conducted by changing the magnitude of the current and/or the voltage to be supplied to the light source and no switching element is used in the dimming level control of the light source, noise derived from an on/off operation of a switching element is not caused, and hence, noise may be reduced. Furthermore, the luminous efficiency may be improved.

In the lighting apparatus of this invention, the control signal is a PWM signal, and the conversion part converts the PWM signal into the analog voltage in accordance with a pulse width of the PWM signal.

According to this invention, since the conversion part is constructed to convert the PWM signal into the analog voltage in accordance with its pulse width, the dimming level control of the light source may be conducted in accordance with the PWM signal, and hence, an existing dimming level controller may be used.

In the lighting apparatus of this invention, the control signal is a PFM signal, and the conversion part converts the PFM signal into the analog voltage in accordance with a frequency of the PFM signal.

According to this invention, since the conversion part is constructed to convert the PFM signal into the analog voltage in accordance with its frequency, the PFM signal may be converted into a signal to be used in the control part with a simple structure.

In the lighting apparatus of this invention, the output part transforms the analog voltage having been converted by the conversion part into an analog voltage corresponding to the set value to be used in the control part.

According to this invention, the output part is constructed to transform the analog voltage having been converted by the conversion part into the analog voltage corresponding to the set value to be used in the control part. For example, the output part for transforming the converted analog voltage into a corresponding analog voltage depending upon whether the control part is a constant current control part for controlling the current to be supplied to the light source to have the set value or a constant voltage control part for controlling the voltage to be supplied to the light source to have the set value is provided. Thus, the signal to be used for the dimming level control of the light source may be obtained through a simple structure in which an analog voltage having been converted by one conversion part is transformed into an analog voltage suitable to each control part.

In the lighting apparatus of this invention, the control part includes a constant current control part and a constant voltage control part for respectively controlling the current and the voltage to be supplied to the light source to have set values, and changes the set values in accordance with the control signal.

According to this invention, the control part contains the constant current control part for controlling the current to be supplied to the light source to have the set value and the constant voltage control part for controlling the voltage to be supplied to the light source to have the set value, and the set values are changed in accordance with the control signal. In accordance with the change of the set values, the magnitudes of the current and the voltage to be supplied to the light source are changed, so as to control the light quantity. Owing to this structure, in the case where the light quantity of the light source is changed in accordance with the control signal, when the light quantity of the light source is large, the light source may be lit in accordance with the set current of the constant current control part, and when the light quantity of the light source is small, the light source may be lit in accordance with the set voltage of the constant voltage control part, and therefore, the dimming level may be stably controlled in accordance with the control signal over a wide range of the light quantity of the light source.

In the lighting apparatus of this invention, the light source is an LED.

According to this invention, since the LED is used as the light source, the dimming level control may be finely conducted by changing the light quantity (emission intensity) by changing the current and/or the voltage.

According to the present invention, the luminous efficiency may be improved and the occurrence of noise may be reduced.

The above and further objects and features will more fully be apparent from the following detailed description with accompanying drawings.

BRIEF DESCRIPTION OF THE SEVERAL VIEWS OF THE DRAWINGS

FIG. 6 is a diagram illustrating the relationship between a reference voltage and a set value of the constant current control part of FIG. 3.

DETAILED DESCRIPTION

Now, the present invention will be described with reference to the accompanying drawings illustrating embodiments thereof.

Embodiment 1

Figure 1:
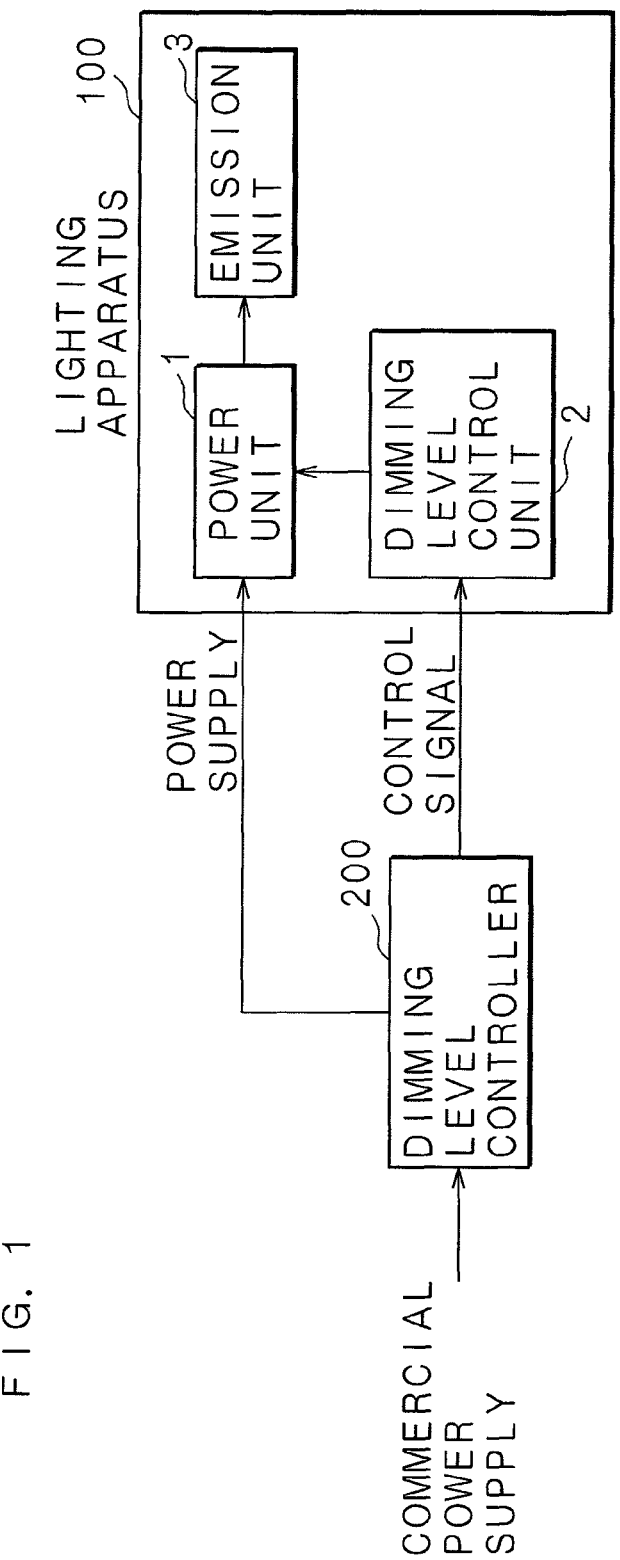
FIG. 1 is a block diagram illustrating a schematic structure of a lighting apparatus according to Embodiment 1 of the invention.

FIG. 1 is a block diagram illustrating a schematic structure of a lighting apparatus according to Embodiment 1 of the invention. The lighting apparatus 100 of Embodiment 1 includes a power unit 1 supplied with power from a dimming level controller 200 to which power is supplied from an external power supply such as a commercial power supply. The lighting apparatus 100 further includes a dimming unit 2 connected to a control signal output terminal of the dimming level controller 200 so as to supply the power unit 1 with a signal in accordance with a control signal given thereto. The power unit 1 is connected to an emission unit 3 supplied with power from the power unit 1, and the emission unit 3 lights with a light quantity in accordance with the control signal given by the dimming level controller 200.

Figure 2:
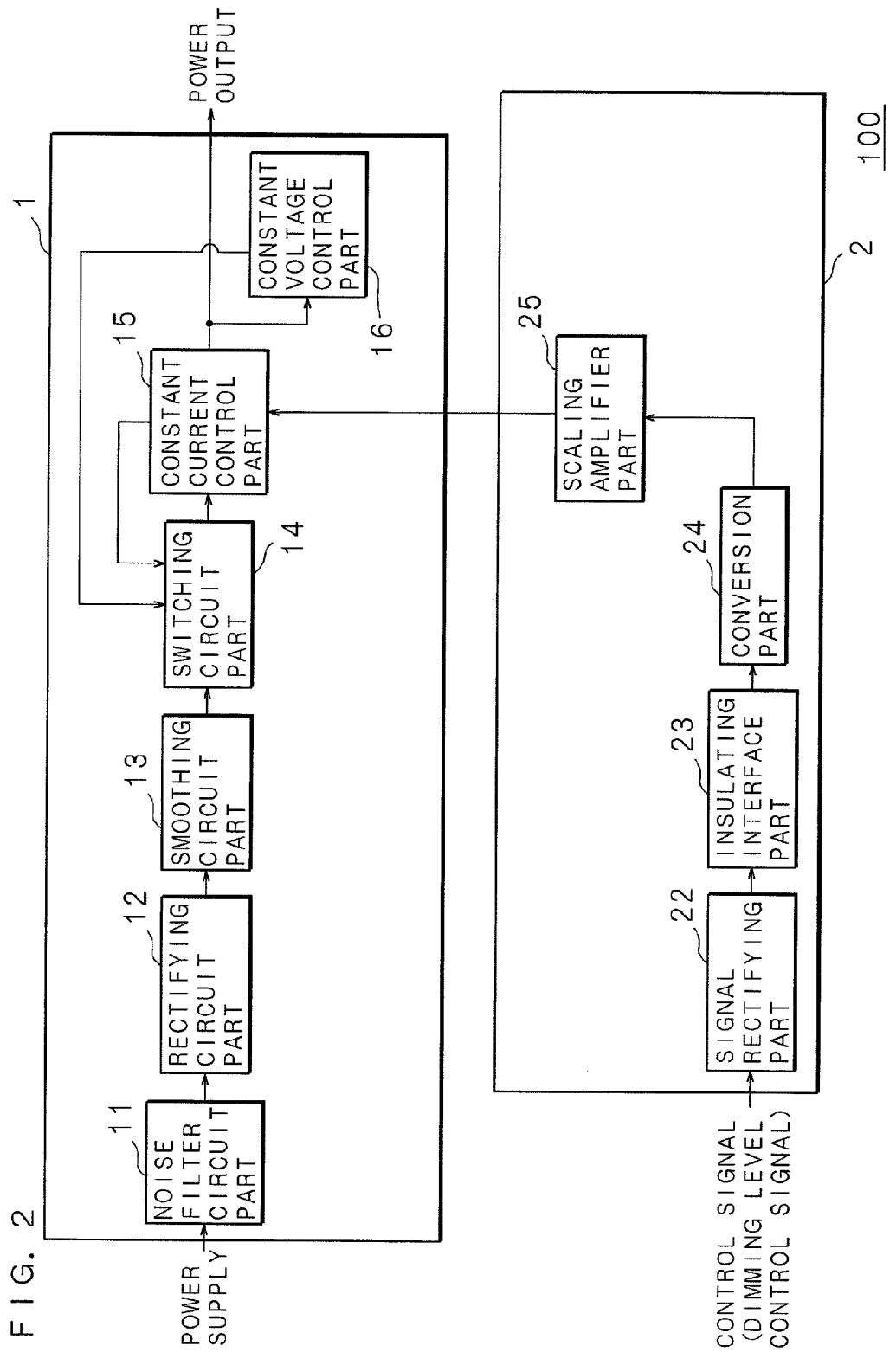
FIG. 2 is a block diagram illustrating a schematic structure of a principal part of the lighting apparatus according to Embodiment 1 of the invention.
Figure 3:
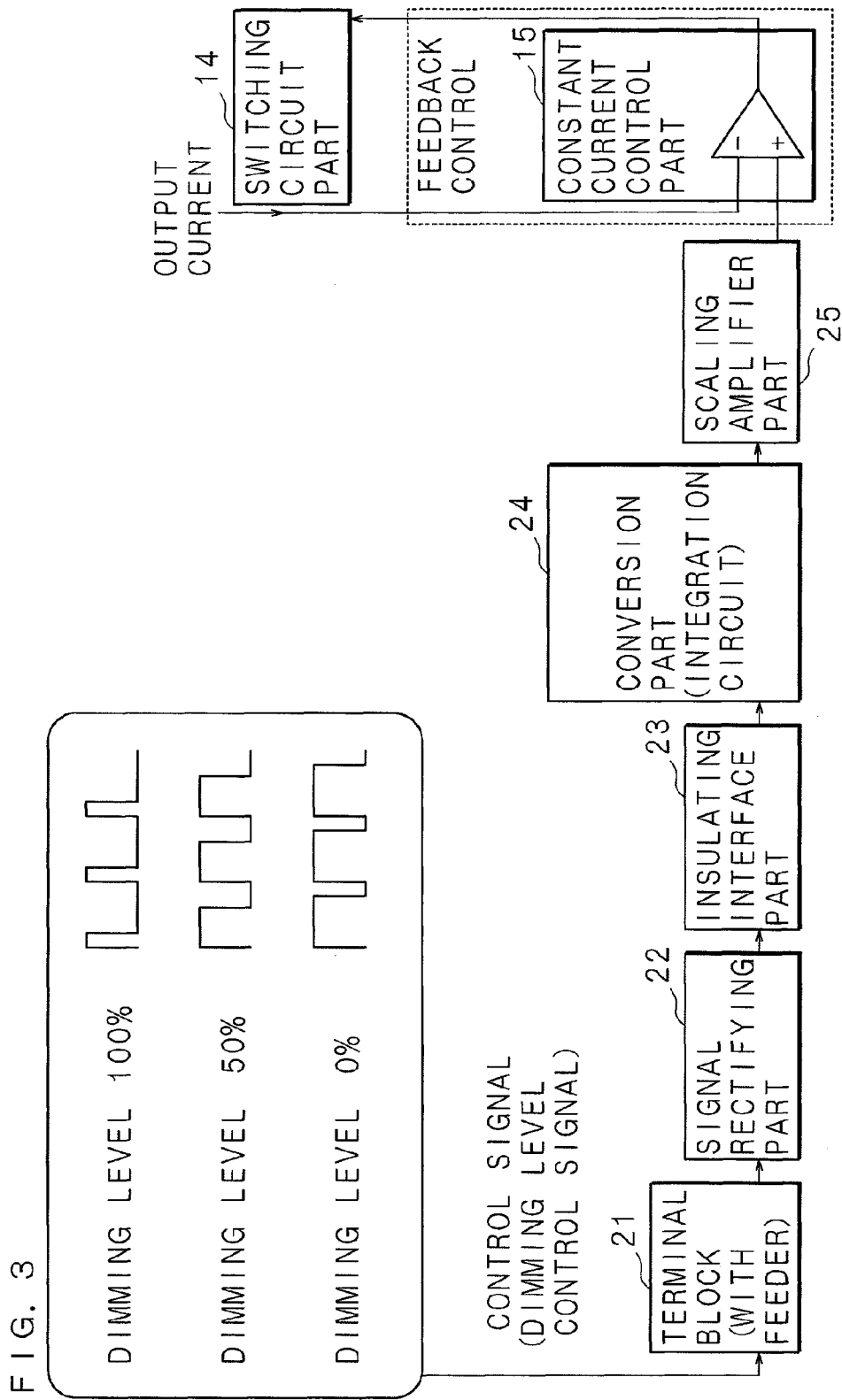
FIG. 3 is a block diagram of a dimming unit of FIG. 1.

FIG. 2 is a block diagram illustrating a schematic structure of a principal part of the lighting apparatus 100 according to Embodiment 1 of the invention. FIG. 3 is a block diagram of the dimming unit 2 of FIG. 1. The power unit 1 includes a noise filter circuit part 11 for removing noise included in an AC current. An input end of the noise filter circuit part 11 is connected to a power output terminal of the dimming level controller 200, and an output end thereof is connected to an input end of a rectifying circuit part 12 including a diode bridge. The rectifying circuit part 12 conducts full-wave rectification of the AC current from which noise has been removed by the noise filter circuit part 11.

An output end of the rectifying circuit part 12 is connected to a smoothing circuit part 13, and an output end of the smoothing circuit part 13 is connected to a switching circuit part 14.

The switching circuit part 14 conducts a switching operation with power supplied from the smoothing circuit part 13 so as to step down a supply voltage of, for example, 100 V to a supply voltage of 35 V. The switching circuit part 14 is connected to a constant current control part 15 and a constant voltage control part 16.

The constant current control part 15 has a structure for controlling a current to be supplied to the emission unit 3 (i.e., an output current of the power unit 1) to have a set value. In other words, it performs feedback control for keeping a current supplied from the power unit 1 to the emission unit 3 to be constant by controlling the switching operation of the switching circuit part 14 so as to make an output current given by the switching circuit part 14 have a set value. The set value of the current is given by the dimming unit 2 described later.

The constant voltage control part 16 has a structure for controlling a voltage to be supplied to the emission unit 3 (i.e., an output voltage of the power unit 1) to have a value not more than a set value. In other words, it performs feedback control for keeping the voltage to be supplied from the power unit 1 to the emission unit 3 to have a value not more than the set value by controlling the switching operation of the switching circuit part 14 when the output voltage is larger than the set value. It is noted that the set value of the voltage is, for example, 35 V and is set to a value higher than the output voltage of the power unit 1 attained when the emission unit 3 is lit with a dimming level of 100%.

The power unit 1 having the aforementioned structure is connected to the emission unit 3 including a plurality of surface mount LEDs.

The dimming unit 2 includes a terminal block 21 connected to the control signal output terminal of the dimming level controller 200. The terminal block 21 is connected to the control signal output terminal of the dimming level controller 200. A control signal (a dimming control signal) is a positive pulse signal as illustrated in FIG. 3 and is a PWM signal having a different duty ratio in accordance with a dimming level (i.e., a level of brightness). In this embodiment, the pulse width (that is, a width of an on time) of the PWM signal is set to be small/large in accordance with the dimming level being high/low (i.e., it being bright/dark) as illustrated in the drawing. It is noted that a dimming level of 100% corresponds to a lighting state with an output of 100%, a dimming level of 0% corresponds to an off state, and a dimming level of 50% corresponds to brightness half as high as that of the dimming level of 100%. Incidentally, the pulse width of the PWM signal is set to be small/large in accordance with the dimming level being high/low (i.e., it being bright/dark) in this embodiment, which may be reversed.

The terminal block 21 is connected to an input end of a signal rectifying part 22 including a diode bridge, so as to give the control signal to the signal rectifying part 22. Thus, the same control signal may be outputted from the signal rectifying part 22 regardless of the connecting direction of a signal line to the terminal block 21.

An output end of the signal rectifying part 22 is connected to an input end of an insulating interface part (insulating I/F part) 23, and an output end of the insulating interface part 23 is connected to a conversion part 24 for converting the control signal of a digital signal into an analog voltage. The insulating interface part 23 includes a photo coupler, and the side of the dimming level controller 200 and the side of the light apparatus 100 are thus electrically insulated from each other, and hence, the dimming level controller 200 (or the lighting apparatus 100) may be prevented from being affected by malfunction or the like of a component of the lighting apparatus 100 (or the dimming level controller 200), so as to secure reliability and safety.

Figure 4:
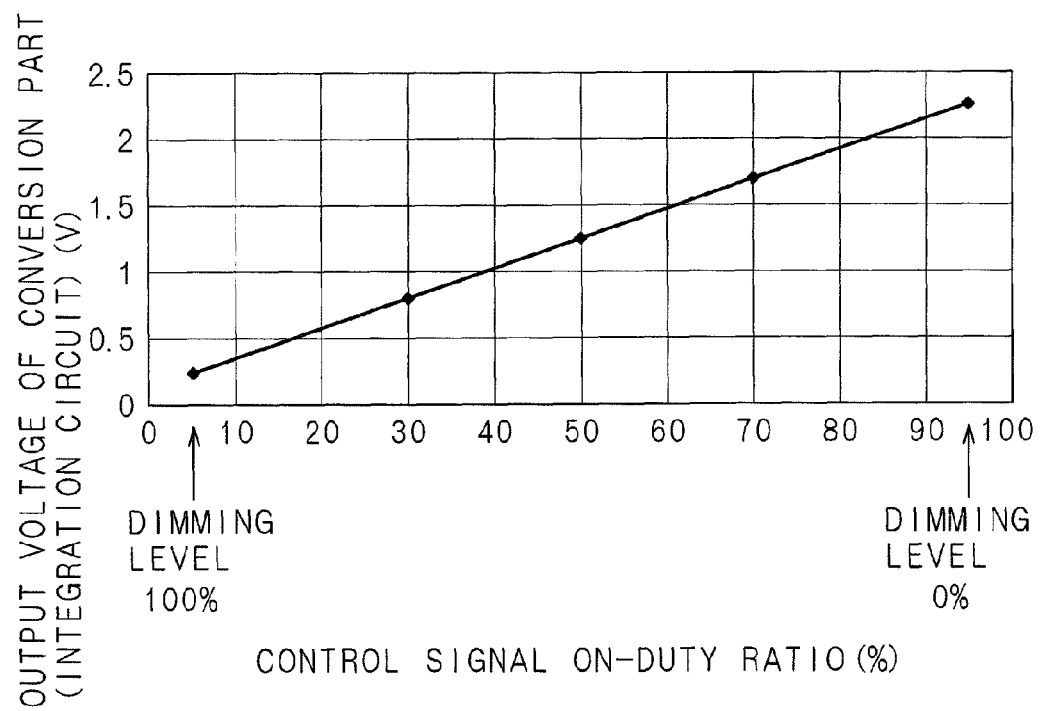
FIG. 4 is a diagram of an output characteristic of a conversion part of FIG. 3.

The conversion part 24 is a low-pass filter, and for example, a low-pass filter for cutting 100 Hz or more in a control signal of 1 kHz is used for converting a pulse signal into an analog voltage through integration. FIG. 4 is a diagram illustrating an output characteristic of the conversion part 24 of FIG. 3. The abscissa of FIG. 4 indicates an on-duty ratio (%) of the control signal, and the ordinate indicates an output voltage (V) of the conversion part 24. Since the pulse width of the PWM signal is set to be small/large in accordance with the dimming level being high/low, the output voltage of the conversion part 24 is set to be low/high in accordance with the dimming level being high/low as illustrated in this drawing.

Figure 5:
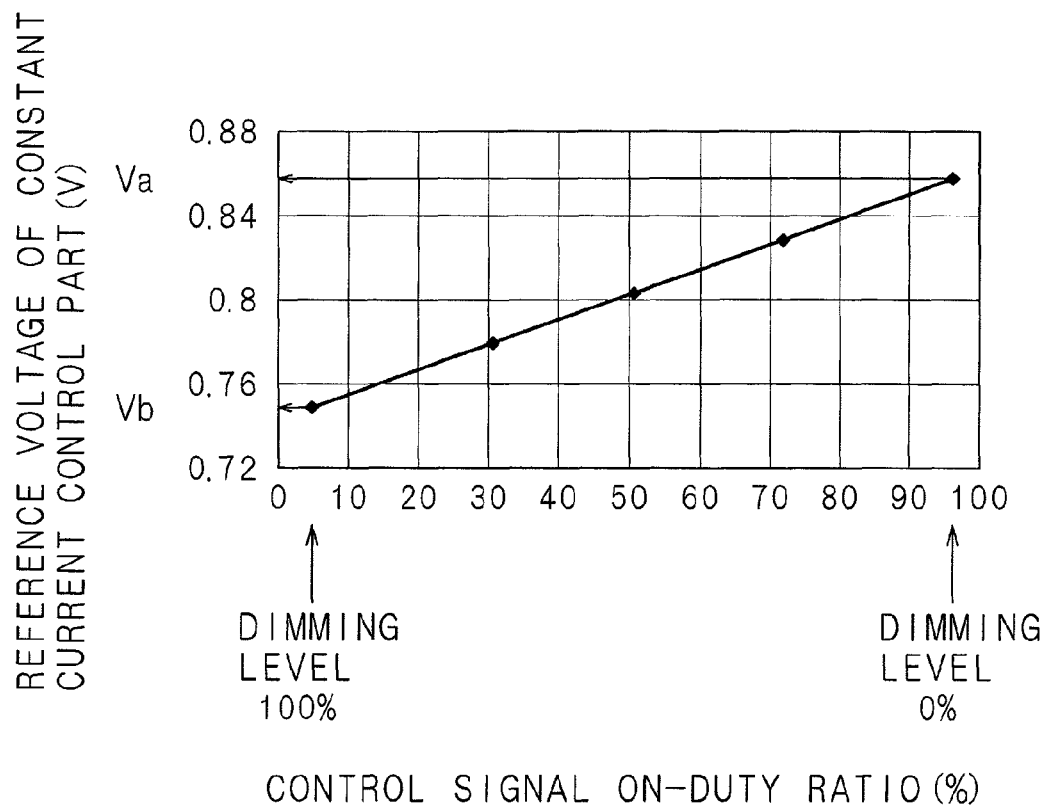
FIG. 5 is a diagram illustrating the relationship between a control signal and an analog voltage to be given to a constant current control part by a scaling amplifying part in FIG. 3.

The conversion part 24 is connected to an input end of a scaling amplifying part 25, and an output end of the scaling amplifying part 25 is connected to the constant current control part 15. The scaling amplifying part 25 is supplied with the output voltage of the conversion part 24. The scaling amplifying part 25 transforms the analog voltage having been converted by the conversion part 24 into an analog voltage corresponding to the current set value to be employed in the constant current control part 15, and outputs the transformed analog voltage to the constant current control part 15. FIG. 5 is a diagram illustrating the relationship between the control signal and the analog voltage to be given to the constant current control part 15 by the scaling amplifying part 25. The abscissa of FIG. 5 indicates an on-duty ratio (%) of the control signal and the ordinate indicates the output voltage (V) of the scaling amplifying part 25, namely, a reference voltage (V) corresponding to the analog voltage given to the constant current control part 15 (specifically, a non-inverted input terminal voltage (V) of a comparator circuit included in the constant current control part 15). In the scaling amplifying part 25, the output voltage of the conversion part 24 is transformed to fall in a range corresponding to an analog voltage defined in the constant current control part 15. In this embodiment, the output voltage of the conversion part 24 is in a range of approximately 0.25 to 2.2 V, and the output voltage of the scaling amplifying part 25 is in a narrow range of approximately 0.75 to 0.86 V.

FIG. 6 is a diagram illustrating the relationship between the reference voltage and the set value of the constant current control part 15 of FIG. 3. The abscissa of FIG. 6 indicates the reference voltage (V) of the constant current control part 15 (corresponding to the ordinate of FIG. 5) and the ordinate indicates the set value of the current of the constant current control part 15. As illustrated in FIGS. 5 and 6, when the dimming level is 100%, the reference voltage of the constant current control part 15 is Vb (V) and the set value of the constant current control part 15 is Ib (A). When the dimming level is 0%, the reference voltage of the constant current control part 15 is Va (V) and the set value of the constant current control part 15 is Ia (A). Specifically, the set value of the current is varied over a range of 0 mA to approximately 300 mA in accordance with the control signal in which the dimming level is varied over a range of 0% to 100%.

As a result, the current supplied to the emission unit 3 becomes a constant continuous current with a set value determined in accordance with the control signal. When the dimming level is, for example, 50%, a continuous current of approximately 150 mA is supplied to the emission unit 3. The supply voltage supplied to the emission unit 3 is controlled to be not more than the set value by the constant voltage control part 16 using a precedently set voltage as the set value.

The dimming level controller 200 is provided on, for example, a wall of a room, and includes a connection terminal to be connected to an external power supply such as a commercial power supply, the power output terminal for supplying power to the power unit 1 of the lighting apparatus 100, the control signal output terminal for outputting a control signal to the dimming unit 2 of the lighting apparatus 100, and an input part for accepting an input operation performed by a user. The input part includes a rotary dimming volume switch corresponding to dimming levels of 0 to 100%. The dimming level controller 200 supplies the power to the power unit 1 of the lighting apparatus 100 and supplies the control signal to the dimming unit 2 of the lighting apparatus 100 in accordance with the input operation performed by a user.

The control signal supplied to the dimming unit 2 is given to the conversion part 24 through the terminal block 21, the current rectifying part 22 and the insulating interface part 23 of the dimming unit 2. The conversion part 24 converts the given control signal into an analog voltage. The conversion of the control signal into the analog voltage is conducted, as described above, by converting the control signal in the conversion part 24 into an analog voltage in accordance with the pulse width thereof. Then, the control signal thus taken is converted into an analog voltage in accordance with the output characteristic as illustrated in FIG. 4.

In accordance with the analog voltage thus converted, the set value of the constant current control part 15 is changed. The change of the set value of the constant current control part 15 is, as described above, conducted in the scaling amplifying part 25 by transforming the analog voltage having been converted by the conversion part 24 to fall in a range of the analog voltage defined by the constant current control part 15 as illustrated in FIG. 5 and by supplying the transformed analog voltage to the constant current control part 15 as the reference voltage. It is noted that the reference voltage to be supplied to the constant current control part 15 and the set value are in the relationship as illustrated in FIG. 6 as described above.

On the basis of the thus changed set value, the constant current control part 15 controls the output current of the power unit 1. The control of the output current of the power unit 1 by the constant current control part 15 is conducted by controlling the switching operation of the switching circuit part 14 so that the output current given by the switching circuit part 14 may have the set value. In other words, the constant current control part 15 functions as light quantity control means for controlling a light quantity by changing the magnitude of the current to be supplied to the emission unit 3 corresponding to the light source.

In the lighting apparatus 100 of Embodiment 1 having the aforementioned structure, when the power is supplied to the power unit 1 by the dimming level controller 200 and the control signal is supplied to the dimming unit 2 by the dimming level controller 200, the magnitude of the current to be supplied to the LED of the emission unit 3 is changed by the constant current control part 15 in accordance with the control signal as described above, and therefore, the LED of the emission unit 3 is lit with a predetermined quantity of light (emission intensity) in accordance with the control signal. As a result, the lighting apparatus 100 is lit at a dimming level given by the dimming level controller 200. Since the dimming level control is conducted by changing the magnitude of the current to be supplied to the LED in this manner, differently from the PWM method in which the dimming level control is conducted by changing the average value of a current to be supplied to the LED by changing the on time of the on/off operation of a switching element, noise derived from the on/off operation of a switching element is not caused, and hence, noise may be reduced. Furthermore, as compared with the PWM method, a predetermined quantity of light may be attained with small input power, and hence, luminous efficiency may be improved. For example, LED luminous efficiency attained in the vicinity of a dimming ratio of 20 to 30% is improved by approximately 10% as compared with that attained by the PWM method.

Furthermore, since the conversion part 24 is constructed to convert a PWM signal into an analog voltage in accordance with the pulse width of the PWM signal, the dimming level of the LED may be controlled in accordance with the PWM signal, and hence, an existing dimming level controller may be used.

Embodiment 2

Figure 7:
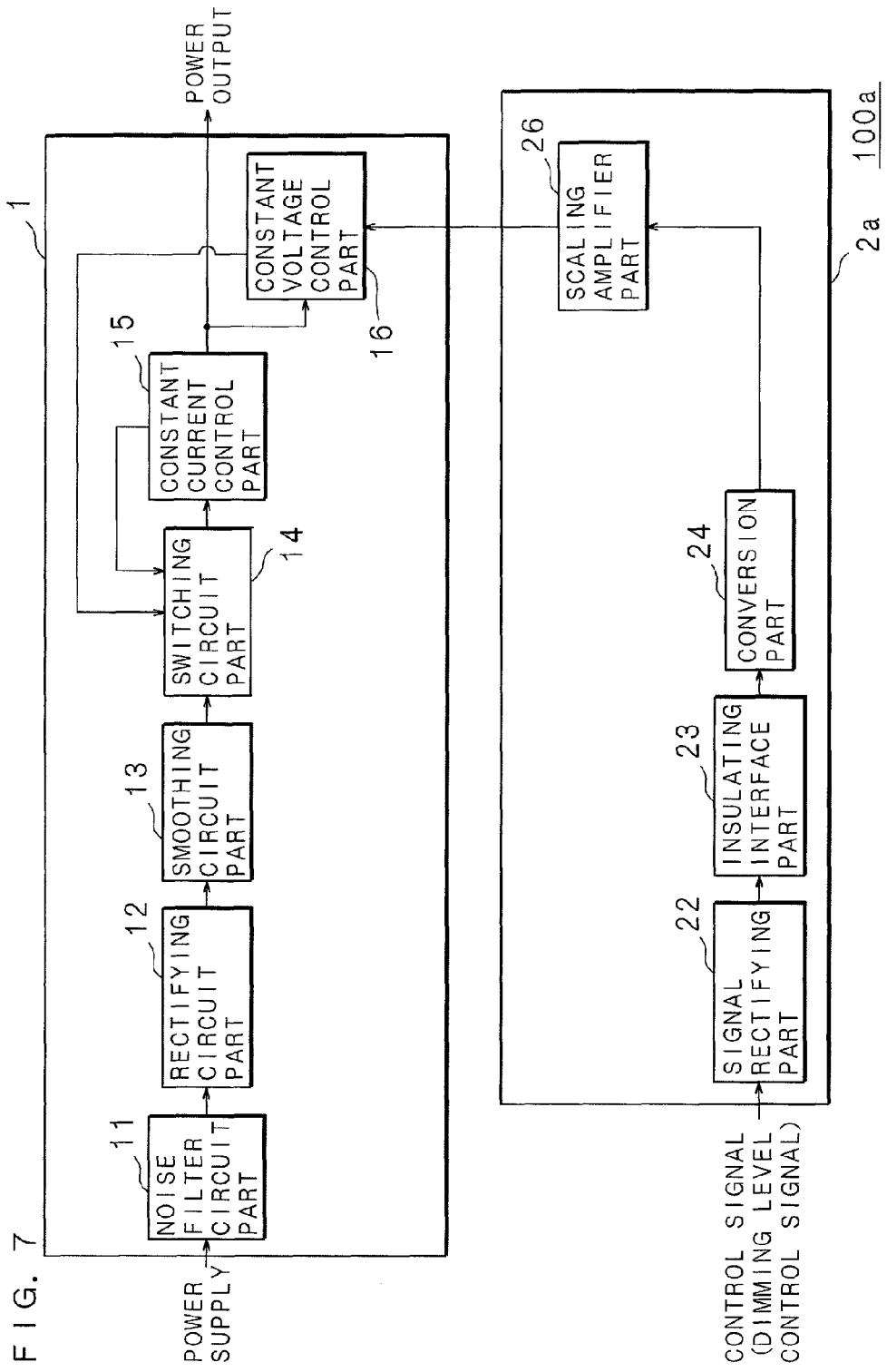
FIG. 7 is a block diagram illustrating a schematic structure of a principal part of a lighting apparatus according to Embodiment 2 of the invention.

FIG. 7 is a block diagram illustrating a schematic structure of a principal part of a lighting apparatus 100*a* according to Embodiment 2 of the invention. A conversion part 24 of a dimming unit 2*a* is connected to an input end of a scaling amplifying part 26, and an output end of the scaling amplifying part 26 is connected to a constant voltage control part 16. The scaling amplifying part 26 is supplied with an output voltage of the conversion part 24. The scaling amplifying part 26 transforms an analog voltage having been converted by the conversion part 24 into an analog voltage corresponding to a voltage set value to be employed in the constant voltage control part 16, and outputs the transformed analog voltage to the constant voltage control part 16. It is noted that the conversion of a PWM signal into an analog voltage performed by the conversion part 24 is conducted in the same manner as in the method described in Embodiment 1, and hence the description is omitted.

Figure 8:
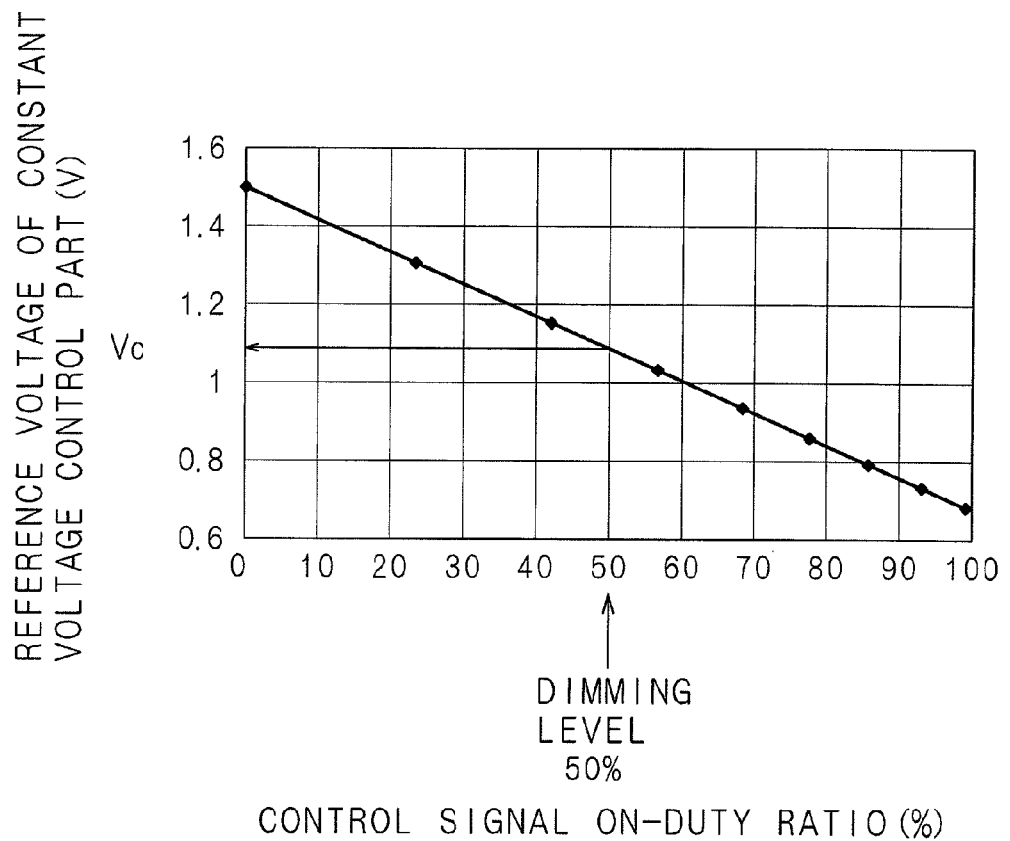
FIG. 8 is a diagram illustrating the relationship between a control signal and an analog voltage to be given to a constant voltage control part by a scaling amplifying part in FIG. 7.

FIG. 8 is a diagram illustrating the relationship between a control signal and an analog voltage given by the scaling amplifying part 26 to the constant voltage control part 16 in FIG. 7. The abscissa of FIG. 8 indicates an on-duty ratio (%) of the control signal and the ordinate indicates the output voltage (V) of the scaling amplifying part 26, namely, a reference voltage (V) corresponding to the analog voltage given to the constant voltage control part 16. In the scaling amplifying part 26, the output voltage of the conversion part 24 is transformed to fall in a range corresponding to an analog voltage defined in the constant voltage control part 16.

Figure 9:
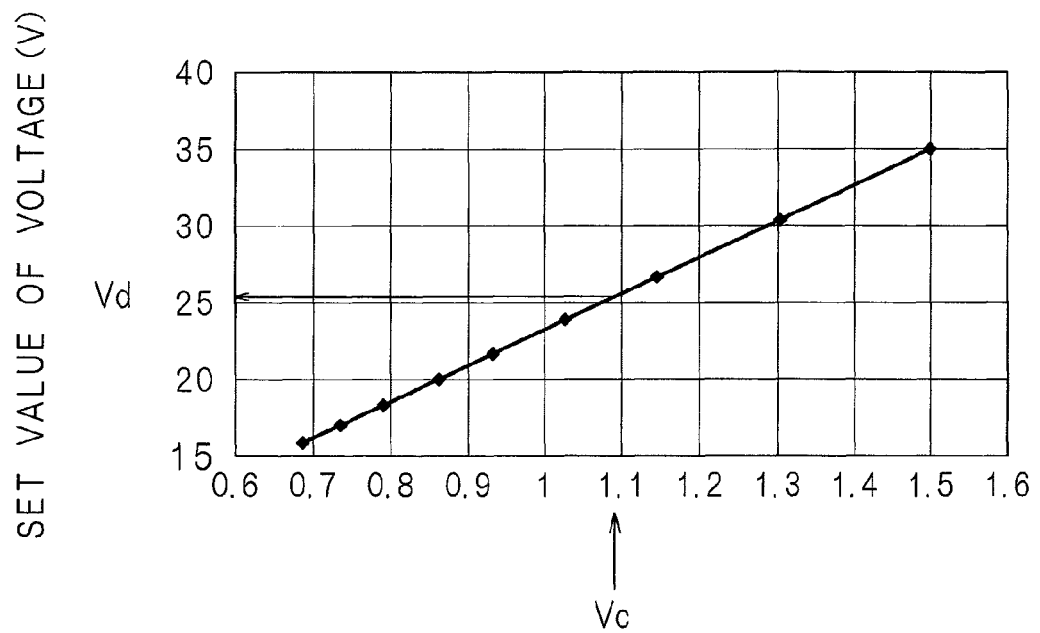
FIG. 9 is a diagram illustrating the relationship between a reference voltage and a set value of the constant voltage control part of FIG. 7.

FIG. 9 is a diagram illustrating the relationship between the reference voltage and the set value of the constant voltage control part 16 of FIG. 7. The abscissa of FIG. 9 indicates the reference voltage (V) of the constant voltage control part 16 (corresponding to the ordinate of FIG. 8), and the ordinate indicates the set value of the constant voltage control part 16. When the dimming level is, for example, 50%, the reference voltage of the constant voltage control part 16 is Vc (V) (of approximately 1.09 V), and the set value of the constant voltage control part 16 is Vd (V) (of approximately 25.5 V). As illustrated in FIGS. 8 and 9, in accordance with the control signal with the dimming level varied over a range of 0% to 100%, the set value of the voltage is varied over a range of approximately 16 V to approximately 35 V.

As a result, the voltage to be supplied to an emission unit 3 is a constant voltage with a set value defined in accordance with the control signal. It is noted that a current to be supplied to the emission unit 3 is controlled by a constant current control part 15 using a precedently set current as a set value. The remaining structure is the same as that of Embodiment 1 illustrated in FIG. 2, and hence, like reference numerals are used to refer to corresponding elements and the detailed description will be omitted.

In the lighting apparatus 100a of Embodiment 2 having the aforementioned structure, when power is supplied to a power unit 1 by a dimming level controller 200 and a control signal is supplied to the dimming unit 2a by the dimming level controller 200, the magnitude of a voltage to be supplied to an LED of the emission unit 3 is changed in accordance with the control signal by the constant voltage control part 16 as described above, and therefore, the LED of the emission unit 3 is lit with a predetermined quantity of light (emission intensity) in accordance with the control signal. In other words, the constant voltage control part 16 functions as light quantity control means for controlling a light quantity by changing the magnitude of a voltage to be supplied to the emission unit 3 corresponding to a light source. Since the dimming level control is conducted by changing the magnitude of the voltage to be supplied to the LED in this manner, differently from the PWM method in which the dimming level control is conducted by changing an average value of a current to be supplied to an LED by the on/off operation of a switching element, noise derived from the on/off operation of a switching element is not caused, and hence, noise may be reduced.

Embodiment 3

Figure 10:
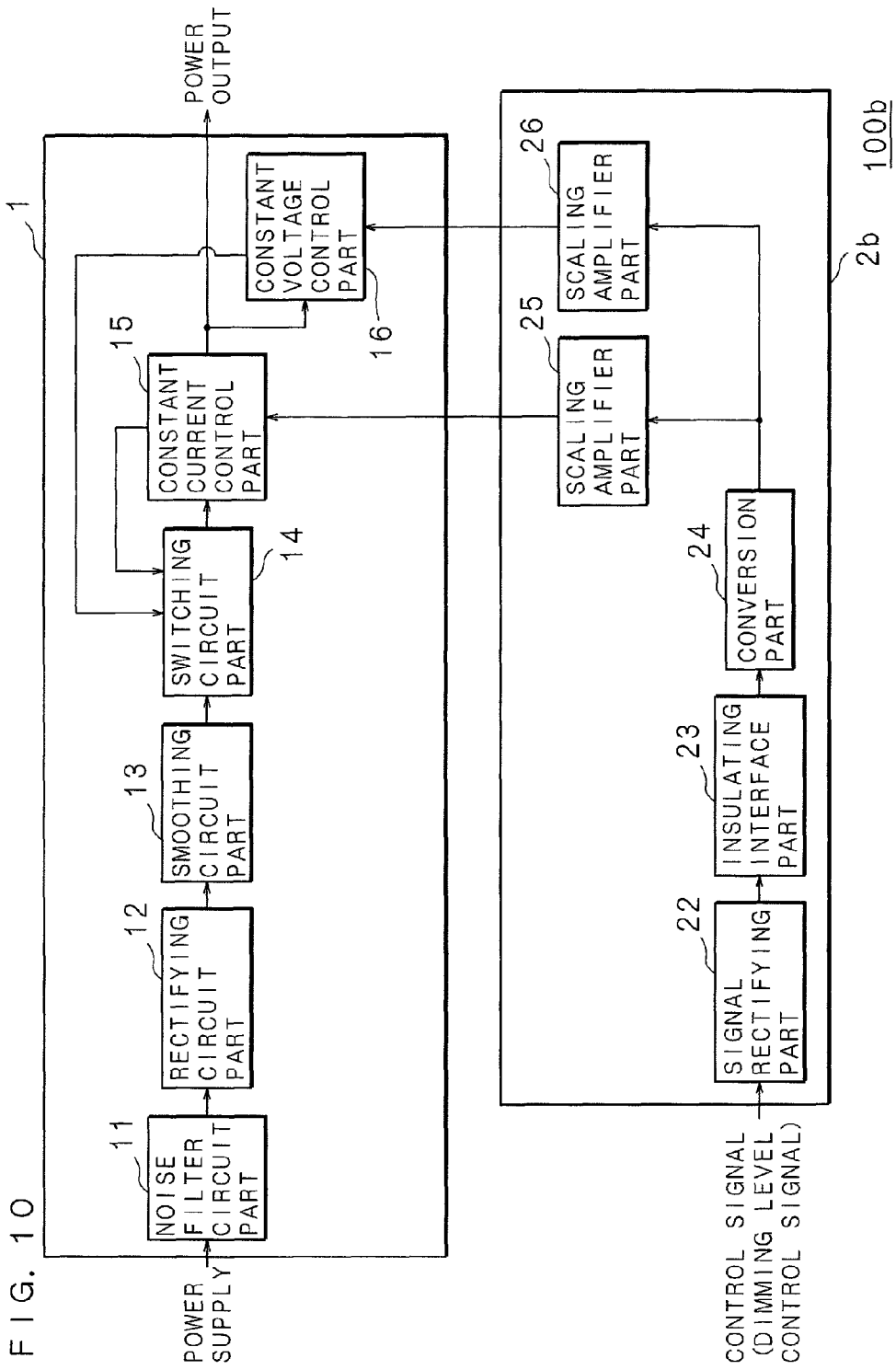
FIG. 10 is a block diagram illustrating a schematic structure of a principal part of a lighting apparatus according to Embodiment 3 of the invention.
Figure 11:
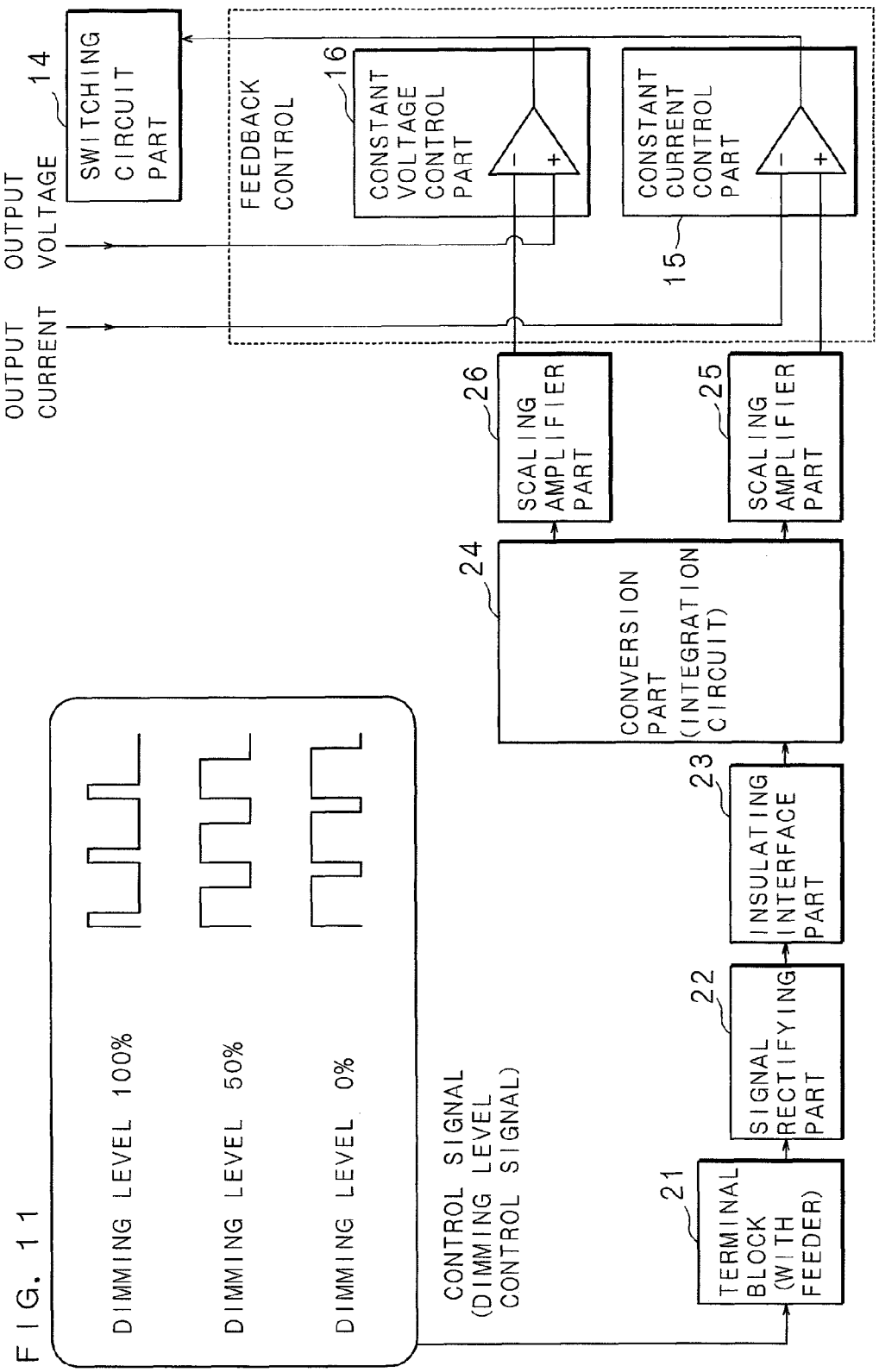
FIG. 11 is a block diagram of a dimming unit of FIG. 10.

FIG. 10 is a block diagram illustrating a schematic structure of a principal part of a lighting apparatus 100b according to Embodiment 3 of the invention. FIG. 11 is a block diagram of a dimming unit 2b of FIG. 10. A conversion part 24 of the dimming unit 2b is connected to an input end of a scaling amplifying part 25, and an output end of the scaling amplifying part 25 is connected to a constant current control part 15. The conversion part 24 of the dimming unit 2b is also connected to an input end of a scaling amplifying part 26, and an output end of the scaling amplifying part 26 is connected to a constant voltage control part 16. The remaining structure is the same as that of Embodiment 1 illustrated in FIGS. 2 and 3, and hence like reference numerals are used to refer to corresponding elements of FIGS. 2 and 3 so as to omit description of the detailed structure.

The constant current control part 15 is constructed to change the magnitude of a current to be supplied to an emission unit 3 in accordance with a control signal as described in Embodiment 1. On the other hand, the constant voltage control part 16 is constructed to change the magnitude of a voltage to be supplied to the emission unit 3 in accordance with the control signal as described in Embodiment 2. Now, output characteristics of a power unit 1 attained by thus changing the magnitudes of the current and the voltage in accordance with the control signal will be described.

Figure 12:
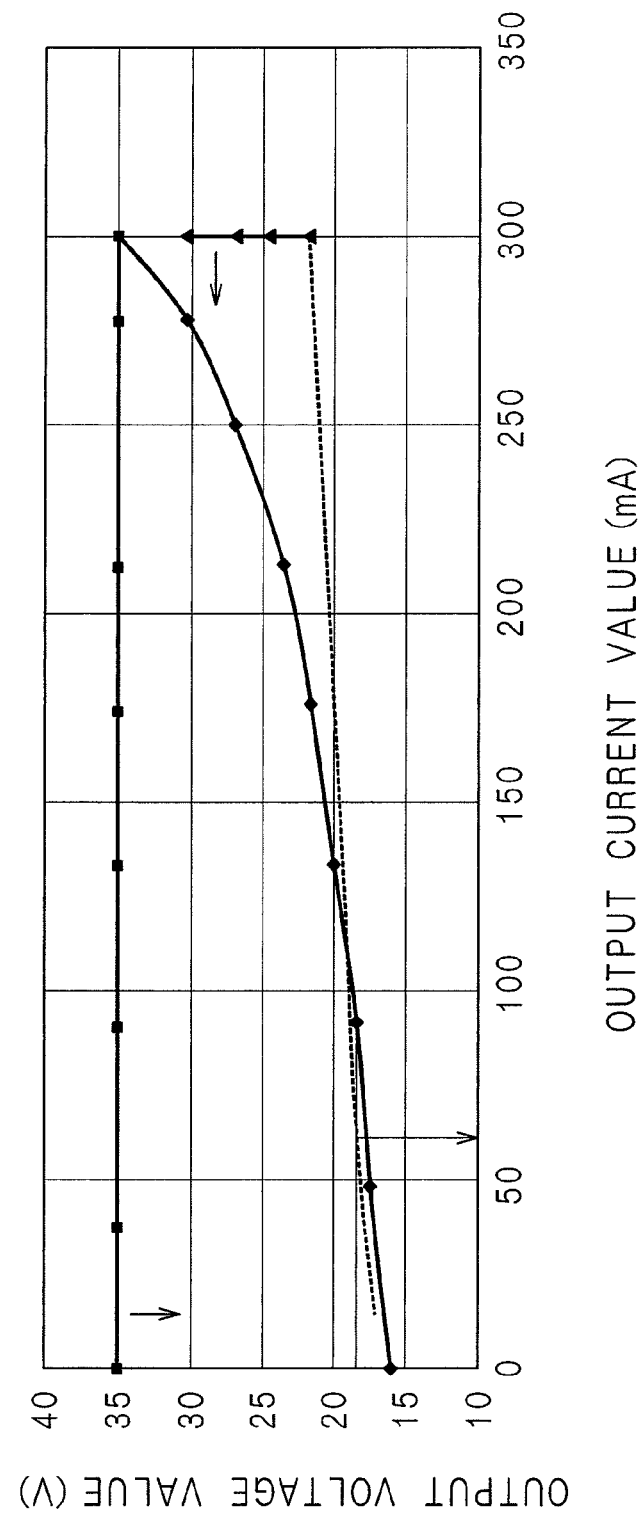
FIG. 12 is a diagram illustrating output characteristics of a power unit of the embodiment.

FIG. 12 is a diagram illustrating the output characteristics of the power unit 1 of this embodiment. The abscissa of FIG. 12 indicates an output current value (mA) and the ordinate indicates an output voltage value (V). Black squares shown in this drawing plot a constant voltage characteristic (corresponding to Embodiment 2) and black triangles plot a constant current characteristic (corresponding to Embodiment 1) of the power unit 1. Black diamonds plot an output characteristic of the power unit 1 of this embodiment, and a broken line corresponds to a current-voltage characteristic of the emission unit 3.

According to the output characteristics of the power unit 1 of this embodiment in which the magnitudes of the current and the voltage are controlled, when the dimming level is 100%, the output current value is 300 mA and the output voltage value is 35 V, and when the dimming level is 0%, the output current value is 0 mA and the output voltage value is approximately 16 V, and these values move on this line in accordance with the dimming level. A line corresponding to the current-voltage characteristic of the emission unit 3 and a line corresponding to the output characteristics of the power unit 1 cross each other in the vicinity of an output current value of approximately 120 mA as illustrated in this drawing.

As an exemplary case where the line corresponding to the output characteristics of the power unit 1 is positioned above the line corresponding to the current-voltage characteristic of the emission unit 3, a case of the dimming level of 100% will be assumed. Since the output voltage of the power unit 1 is controlled by the constant voltage control part 16 to be not more than 35 V, a voltage up to 35 V may be applied to the emission unit 3. A voltage generated in the emission unit 3 when a current of 300 mA is supplied to the emission unit 3 is approximately 22 V (more specifically, in a range of approximately 22 to 30 V depending upon the variation of LEDs) as understood from the current-voltage characteristic of the emission unit 3, and the output voltage of the power unit 1 is thus higher than the voltage generated in the emission unit 3. Accordingly, a current passing through the emission unit 3 is controlled to be a constant current of 300 mA by the constant current control part 15 without being affected by the control conducted by the constant voltage control part 16. In other words, the case where the line corresponding to the output characteristics of the power unit 1 is positioned above the line corresponding to the current-voltage characteristic of the emission unit 3 is identical to a case where the control is conducted by changing the magnitude of the current to be supplied to the emission unit 3 by the constant current control part 15 (corresponding to Embodiment 1).

On the other hand, as an exemplary case where the line corresponding to the output characteristics of the power unit 1 is positioned below the line corresponding to the current-voltage characteristic of the emission unit 3, a case of the dimming level of 25% (corresponding to the third black diamond from the left in FIG. 12 where the output voltage is approximately 18 V and the output current is approximately 90 mA) will be assumed. Since the output voltage of the power unit 1 is controlled by the constant voltage control part 16 to be not more than approximately 18 V, a voltage that may be applied to the emission unit 3 is up to approximately 18 V. On the other hand, a voltage necessary for allowing a current of approximately 90 mA to pass through the emission unit 3 is approximately 18.5 V as understood from the current-voltage characteristic of the emission unit 3, and the output voltage of the power unit 1 is lower than the voltage generated in the emission unit 3 when a current of approximately 90 mA is supplied. Accordingly, a current passing through the emission unit 3 is affected by the control conducted by the constant voltage control part 16 and hence is a current value (of approximately 70 mA) corresponding to the intersection point between the set value of approximately 18 V of the constant voltage control part 16 and the current-voltage characteristic of the emission unit 3. In other words, the case where the line corresponding to the output characteristics of the power unit 1 is positioned below the line corresponding to the current-voltage characteristic of the emission unit 3 is identical to a case where the control is conducted by changing the magnitude of the voltage to be supplied to the emission unit 3 by the constant voltage control part 16 (corresponding to Embodiment 2).

In this manner, in the case where the light quantity of the emission unit 3 is changed in accordance with the control signal, when the light quantity of the emission unit 3 is large, the emission unit 3 is lit in accordance with the set current of the constant current control part 15, and when the light quantity of the emission unit 3 is small, the emission unit 3 is lit in accordance with the set voltage of the constant voltage control part 16. In other words, the constant current control part 15 and the constant voltage control part 16 function as light quantity control means for controlling the light quantity by changing the magnitude of the current and/or the voltage to be supplied to the emission unit 3 corresponding to the light source. Accordingly, when the light quantity is large, the dimming level is controlled by changing the magnitude of the current, and hence, the light quantity may be smoothly changed in accordance with the control signal, and in addition, a desired quantity of light may be obtained with small input power as described above, resulting in improving the luminous efficiency.

Incidentally, in the case where the light quantity is small, when the current is to be changed for the dimming level control, it is necessary to reduce the output current of the power unit 1 to be small. When the output current of the power unit 1 is to be reduced to be very small (i.e., when the dimming level is to be made close to 0%), however, the operation of the switching circuit part 14 may not be smoothly performed, and hence, it is apprehended that the dimming level may not be sufficiently controlled. On the contrary, in the case where the light quantity is small, when the dimming level is controlled by changing the magnitude of the voltage as in this embodiment, the light quantity may be smoothly changed in accordance with the control signal. As a result, the dimming level may be controlled stably in accordance with the control signal over a wide range of the light quantity of the emission unit 3.

The output part for transforming the voltage into a corresponding analog voltage depending upon whether the constant current control part for controlling the current to be supplied to the emission unit 3 to have the set value or the constant voltage control part for controlling the voltage to be supplied to the emission unit 3 to have the set value is used is provided, and therefore, a signal to be used for the dimming level control of the emission unit 3 may be obtained with a simple structure in which the analog voltage having been converted by one conversion part is transformed into an analog voltage suitable to the corresponding control part.

Although the current set value on the intersection point between the line corresponding to the current-voltage characteristic of the emission unit 3 and the line corresponding to the output characteristics of the power unit 1 is described to be in the vicinity of approximately 120 mA in the aforementioned embodiment, the current set value on this intersection point is different depending upon the type, the number, the arrangement and the like of the LEDs used in the emission unit 3.

Although the control signal supplied by the dimming level controller 200 is the PWM signal in the aforementioned embodiments, the control signal is not limited to this but may be a PFM signal. In the case where the control signal is a PFM signal, a structure for converting the control signal into an analog voltage in accordance with the frequency of the PFM signal is employed. Since an F-V inverter for inverting a frequency to an analog voltage is generally constructed by one chip, the number of components may be thus reduced, so as to obtain a signal to be used in the control part with a simple structure.

Furthermore, although one lighting apparatus is connected to one dimming level controller in the embodiments, a plurality of lighting apparatuses may be connected to one dimming level controller. For example, in a room such as an office or a shop, a lighting system in which a plurality of lighting apparatuses installed in the room may be controlled by one dimming level controller provided on a wall is employed, and the lighting apparatus of the invention may be used in such a lighting system. Moreover, the circuit configurations, the numerical values of voltages and the like of the respective circuits and the like mentioned in the aforementioned embodiments are merely exemplarily described, and they are different in accordance with the type of a dimming level controller connected to the lighting apparatus but may be set by a similar way.

In addition, although the surface mount LED is used as the light source of the emission unit in each of the aforementioned embodiments, the light source is not limited to this but another type of LED may be used.

Furthermore, it goes without saying that the present invention may be practiced in various modes modified and changed within the scope of the appended claims.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:
1. A lighting apparatus, comprising:
   a light source;
   a control part controlling a light quantity of the light source on the basis of a control signal;

a conversion part converting the control signal into an analog voltage; and an output part converting the converted analog voltage to each reference voltage corresponding to each set value of the current and the voltage to be supplied to the light source and outputting to the control part, wherein the control part includes a light quantity control part which has a constant current control part and a constant voltage control part and controls the light quantity by changing magnitude of a current and/or a voltage to be supplied to the light source to be the set value on the basis of the reference voltage, wherein the constant current control part controls magnitude of the current to be supplied to the light source to be the set value when the light quantity of the light source is larger than a predetermined value, and wherein the constant voltage control part controls magnitude of the voltage to be supplied to the light source to be the set value when the light quantity of the light source is smaller than the predetermined value.

2. The lighting apparatus according to claim 1,
wherein the control signal is a PWM signal, and
the conversion part converts the PWM signal into the analog voltage in accordance with a pulse width of the PWM signal.

3. The lighting apparatus according to claim 1,
wherein the light source is an LED.

4. The lighting apparatus according to claim 1,
wherein the predetermined value is a light quantity corresponding to a current value of a point of intersection of a line indicating a current-voltage characteristics of a power supply part, which supplies power to the light source, and a line indicating a current-voltage characteristics of the light source.

5. The lighting apparatus according to claim 1,
wherein the constant current control part and the constant voltage control part are connected to a switching circuit part for stepping down a power supply voltage to be supplied to a prescribed voltage, and perform a feedback control of the switching circuit part in accordance with the set value.

6. The lighting apparatus according to claim 1,
wherein an analog voltage converted by the one conversion part is supplied to any of the plurality of output parts, which are connected to the constant current control part and the constant voltage control part individually.

7. The lighting apparatus according to claim 1,
wherein the output part includes a first output part converting the analog voltage into the reference voltage relative to the set value of the current to be supplied to the light source to output, and a second output part converting the analog voltage into the reference voltage relative to the set value of the voltage to be supplied to the light source to output, and
the conversion part outputs the analog voltage to each of the first output part and the second output part.

8. The lighting apparatus according to claim 1,
wherein the range of the analog voltage is narrower than the range of the reference voltage.

9. A light controlling apparatus provided with a control part controlling a light quantity of a light source on the basis of a control signal, comprising:

a conversion part converting the control signal into an analog voltage; and an output part converting the converted analog voltage to each reference voltage corresponding to each set value of the current and the voltage to be supplied to the light source and outputting to the control part, wherein the control part includes a light quantity control part which has a constant current control part and a constant voltage control part and controls the light quantity by changing magnitude of a current and a voltage to be supplied to the light source to be the set value on the basis of the reference voltage, wherein the constant current control part controls magnitude of the current to be supplied to the light source to be the set value when the light quantity of the light source is larger than a predetermined value, and wherein the constant voltage control part controls magnitude of the voltage to be supplied to the light source to be the set value when the light quantity of the light source is smaller than the predetermined value.

* * * * *